J. G. VINCENT.
METHOD OF MACHINING HYDROCARBON MOTORS.
APPLICATION FILED OCT. 4, 1916.

1,336,800.

Patented Apr. 13, 1920.
4 SHEETS—SHEET 1.

Witness:
J. C. L. Blackmore

Inventor:
Jesse G. Vincent,
by Milton Tibbetts, Atty.

J. G. VINCENT.
METHOD OF MACHINING HYDROCARBON MOTORS.
APPLICATION FILED OCT. 4, 1916.

1,336,800.

Patented Apr. 13, 1920.
4 SHEETS—SHEET 4.

Witness:
J.E.L.Blackmore.

Inventor:
Jesse G. Vincent,
by Milton Tibbetts,
Atty.

UNITED STATES PATENT OFFICE.

JESSE G. VINCENT, OF DETROIT, MICHIGAN, ASSIGNOR TO PACKARD MOTOR CAR COMPANY, OF DETROIT, MICHIGAN, A CORPORATION OF MICHIGAN.

METHOD OF MACHINING HYDROCARBON-MOTORS.

1,336,800.  Specification of Letters Patent.  Patented Apr. 13, 1920.

Application filed October 4, 1916. Serial No. 123,715.

*To all whom it may concern:*

Be it known that I, JESSE G. VINCENT, a citizen of the United States, and resident of Detroit, Wayne county, State of Michigan, have invented certain new and useful Improvements in Methods of Machining Hydrocarbon-Motors, of which the following is a specification.

This invention relates to motor cylinders and to the method and machinery for making them.

In particular the invention relates to cylinders having puppet valves in the heads, and as shown the barrel and head parts of the cylinders are integral, and more particularly to the method of machining cylinders of that description.

It is one of the objects of the invention to provide a process of manufacturing a motor cylinder having a fully machined interior wall.

Another object of the invention is to accurately machine the interior walls of a cylinder in which the barrel and head parts are integral.

Another object of the invention is to provide a process of manufacturing a motor cylinder in which the barrel and head are integral, in which the valves are in the head, and in which pockets are formed to give greater clearance around the valves and to form a ledge to catch the valve in case of breakage of the stem.

Another object of the invention is to fully and accurately machine a cylinder such as described in the preceding paragraph.

Another object of the invention is to provide a process of machining a motor cylinder having upwardly extending valves in the head, with guides for said valves that may be removed to permit lateral movement of the valves for withdrawal.

Other objects of the invention will appear from the following description taken in connection with the drawings which form a part of this specification, and in which:—

Although the invention claimed in this application is limited to the process of manufacturing and machining cylinders, the construction of the cylinder to be made by my improved process will first be described, after which the method of making the cylinder will be explained.

Figure 1:
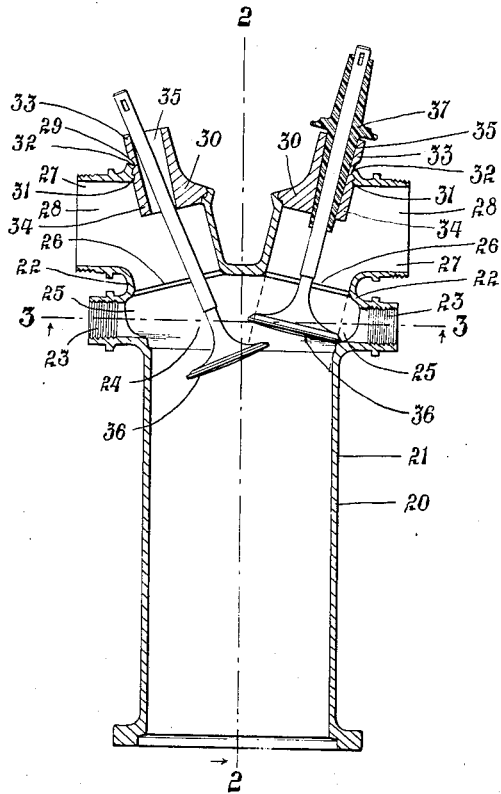
Figure 1 is a longitudinal section through a motor cylinder made in accordance with this invention, one of the valves being shown partly removed.
Figure 2:
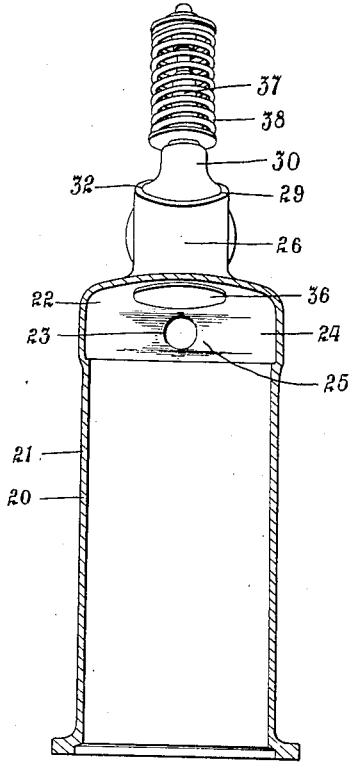
Fig. 2 is a longitudinal section on the line 2—2 of Fig. 1, the valves being closed.
Figure 3:
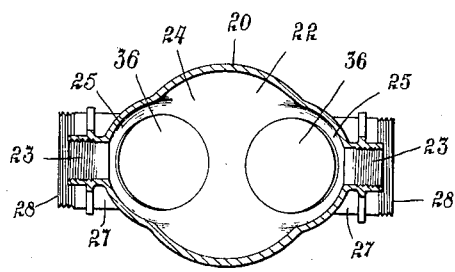
Fig. 3 is a transverse section on the line 3—3 of Fig. 1, both valves being closed.

A finished motor cylinder made in accordance with this invention is illustrated in Figs. 1, 2 and 3. 20 indicates the cylinder as a whole and 21 is the body or barrel part and 22 is the head. Spark plug openings 23 are formed in both sides of the head as shown particularly in Fig. 1.

The body and head parts of the cylinders shown are integral and the interior of the body part 21 is machined as by reaming. The combustion space 24 is formed in the head above the cylinder barrel and it is of somewhat dome shape with slight enlargements or pockets 25 on opposite sides of the head. This combustion space is machined all over to provide a smooth interior and to insure uniformity in size of combustion space when several cylinders are used in a motor cylinder motor.

In the upper wall of the cylinder head and above the pockets 25 are intake and exhaust ports 26, which form the openings into the cylinder for the gas passages 27. These passages 27 have external openings 28 to which suitable pipes may be connected, and they are further formed with openings 29 in their upper sides, in which plugs 30 are secured. The entire walls of the passages 27 are machine finished and each of the openings 29 is machined to form a shoulder 31 against which the plug 30 may rest. The plug may be secured in place in any desired way as by welding or by peening over the edge 32 as shown in Fig. 1.

Each of the plugs 30 is formed with bosses 33 and 34 thereon and through the plug and bosses a diagonally extending hole 35 is made. The axis of this hole 35 is substantially at right angles to the port 26 when the plug 30 is in position, as shown in the drawings.

Each port 26 forms a valve seat for a puppet valve 36, the stem of which extends through the diagonal hole 35 in the plug 30 and is surrounded by a sleeve 37 which seats in said hole, and in which the valve stem slides. A spring 38 surrounds the valve stem and yieldingly retains the valve in closed position, and the valve may be operated in the usual manner by suitable valve tappets not shown.

It will be seen that the port 26 is arranged slightly diagonally in the cylinder head, and it is so arranged relative to the interior of the cylinder wall that a downward continuation of the cylinder of said port, as shown in dotted lines in Fig. 1, would just clear the cylinder wall, so that the head of the puppet valve 36 which, of course, is slightly larger than the port 26, would not quite clear said cylinder wall when the valve is guided coaxially with the hole 35, and consequently with the port 26. Thus if the valve spring should break and let the valve drop down into the combustion space it would not drop into the cylinder and against the piston, but would be caught on the ledge formed by the lower wall of one of the pockets 25, as shown at the right hand side in Fig. 1. This would localize the accident whereas the valve dropping into the cylinder would upon the upstroke of the piston cause a breakage of the cylinder or piston or other vital parts of the motor.

It will be understood that the valve 36 may be removed by first withdrawing the sleeve 37 and then moving the valve laterally so that its head clears the cylinder wall, this by reason of the fact that the valve stem is smaller than the hole 35. The valve may then be withdrawn through the cylinder. Obviously the valve may be assembled or replaced by the reverse operation.

The process or method by which the cylinder above described is finished or machined may be described as follows:

The cylinder casting is first bored and reamed to form the smooth interior wall of the cylinder barrel. This smooth interior wall of the cylinder barrel is then used as a guide for a tool which rotates in the upper end of the cylinder and forms the domed combustion space. A somewhat smaller rotary tool is then employed and guided by the cylinder walls and by relatively oscillating the tool and cylinder the pockets 25 are machined out. Another tool, guided in the cylinder, is used to form the inner part of the gas passages 27 and suitable drills are employed from the outside to intersect the passages formed from the inside of the cylinder and thus finish these passages and form the shoulders 31 of the openings 29. Several intermediate steps may be employed also to round off any sharp edges that may be otherwise formed.

For the purpose of carrying out the above process or method and for making the cylinder above described, the invention comprises the machine or apparatus shown in the drawings, and which will now be described.

50 represents the base of a machine, upon which are suitable bearings 51 for a drill or tool spindle 52, which may be rotated by any suitable mechanism, not shown. The tool spindle 52 is also capable of being moved lengthwise or axially, either by hand or automatically, for the purpose of advancing and retarding the tool which it operates.

Figure 4:
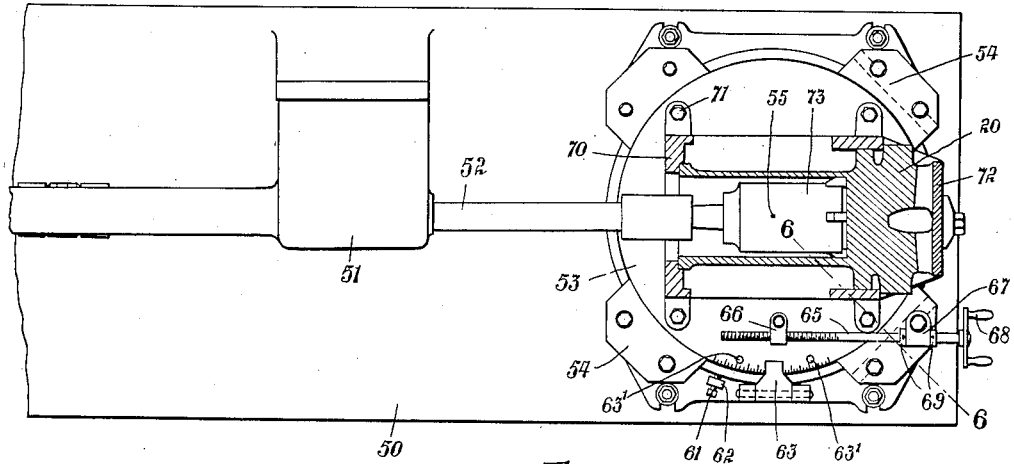
Fig. 4 is a plan view of a machine embodying, and adapted to carry out the process of, this invention.
Figure 6:
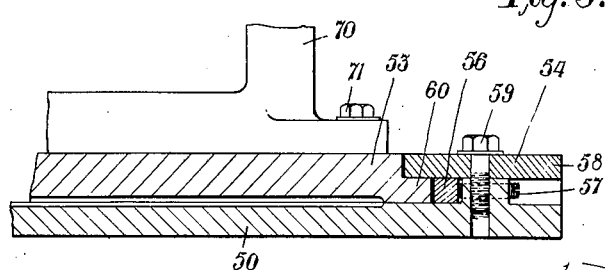
Fig. 6 is an enlarged sectional view on the line 6—6 of Fig. 4.

At the right hand end of the base 50 shown in Fig. 4 is mounted a work table 53, suitable guiding plates 54 permitting the table to be oscillated or rotated about an axis 55 which is normal to and intersects the axis of the tool spindle 52. The specific mounting of this table 53 is shown in detail in Fig. 6 where the guides 54 are shown in two parts, one part 56 forming a shoe which is adjustable by a set screw 57, and the other part 58 forming a clamp secured in place on the base 50 as by bolts 59. The table 53 is formed with an annular flange 60 by which the clamps 58 and shoes 56 retain and guide the table on the base.

The table 53 may be retained in any set position as by a set screw 61 extending through a threaded orifice in a lug 62 projecting upwardly from the base whereby said set screw abuts the side of the table.

When the set screw 61 is eased off, the table may be oscillated or rotated, a stop plate 63 being pivotally supported adjacent said table and having a lug resting thereon in the path of the pins 63' so that the table is readily positioned at a predetermined angle, or the stop plate may be swung clear and the table rotated at will.

Figure 5:
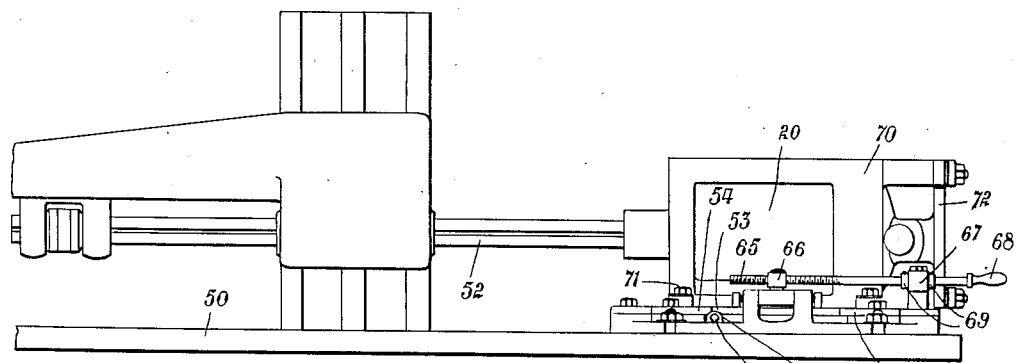
Fig. 5 is a side elevation of the machine shown in Fig. 4.

Means for oscillating the table slowly by hand are provided in the form of a threaded shaft 65, mounted in pivoted members 66 and 67 on the table and base respectively as shown in Figs. 4 and 5. The shaft 65 is provided with a handle 68 and it is threaded in the member 66, but allowed to turn freely in the member 67, the collars 69 preventing endwise movement in said member 67. It will be seen that the table 53 may be rotated to a limited degree by operating the shaft 65 by hand or otherwise as may be desired.

In Figs. 1, 2 and 3 the numeral 20 has been used to indicate the motor cylinder. The same numeral 20 will be used throughout the drawings to indicate the motor cylinder whether it be finished or in process of making. In Figs. 4 and 5, therefore, 20 indicates a motor cylinder secured on the table 53 as by a jig or clamp 70. The jig is secured to the table as by the bolts 71, and it is so formed that the cylinder 20 fits into it and is held by a detachable plate 72, with the open end of the cylinder barrel in line with the axis of the tool spindle 52.

When the cylinder is thus in place, and the table 53 held in its normal position by the set screw 61 as shown in Fig. 4, the tool spindle 52 is supplied with a reamer 73 which is advanced into the open end of the cylinder barrel. In Fig. 4 the reamer is shown in its fully advanced position having completed the operation of smoothly machining the interior of the cylinder barrel.

Figure 7:
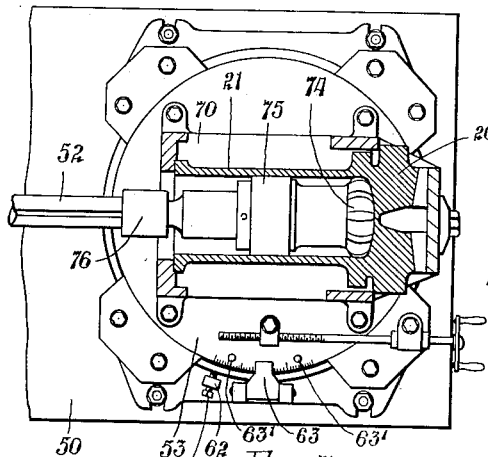
Figs. 7 to 11 are views similar to Fig. 4, but showing different tools and tool guides in the machine, the work table being in various positions in the different views.

In Fig. 7 the next step is shown, comprising the machining of the combustion space into dome form as by a dome shaped tool 74 guided in the cylinder by a cylindrical part 75 of said tool. The tool is connected to the tool spindle 52 by a socket connection 76 which compels rotation of the tool while at the same time permitting the tool to be replaced by others as the work on the cylinder proceeds.

Figure 8:
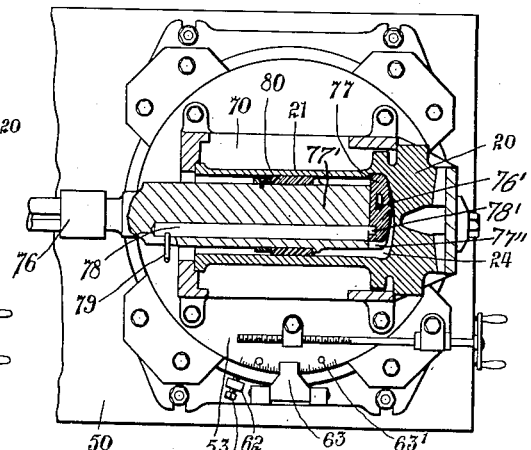

In Fig. 8 the combustion space is being slightly enlarged all the way around. A tool 77 is mounted to slide laterally of a spindle 77', a slot 77'' being formed in the inner end of the spindle for this purpose. A pin and slot connection 76' retains the tool 77 in the slot. The tool 77 is moved in the slot 77'' by a shaft 78 mounted in the spindle 77', said shaft having an offset lug 78' extending into the tool 77. The shaft 78 is oscillated by a handle 79 to thereby advance the tool 77 so that it may cut deeper into the metal and thereby enlarge the combustion space. The spindle 77' is guided in the cylinder by a cylindrical part or sleeve 80 which fits the interior wall of the cylinder barrel.

Figure 9:
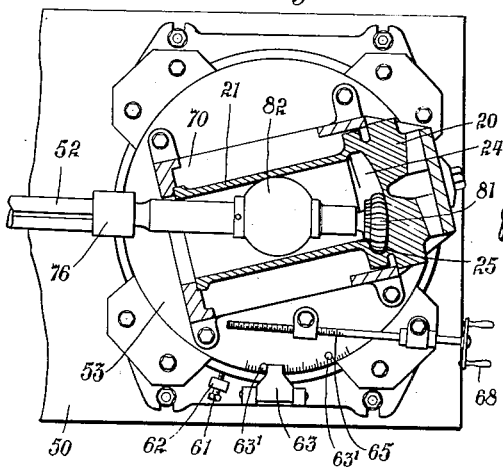

In Fig. 9 a smaller tool 81 is used and it is guided in the cylinder barrel by a ball shaped guide 82, which permits of the oscillation of the cylinder about an axis which intersects the axis of the rotating tool.

It will be understood that as the tool 81 is rotated the table 53, and consequently the cylinder 20, is oscillated as by the shaft 65 until the tool finishes the pockets 25 which are desired in the opposite sides of the cylinder head, the pins 63' contacting with the plate 63 and thus limiting the oscillation of the table in either direction. The form of these pockets is clearly shown in the drawings.

Figure 10:
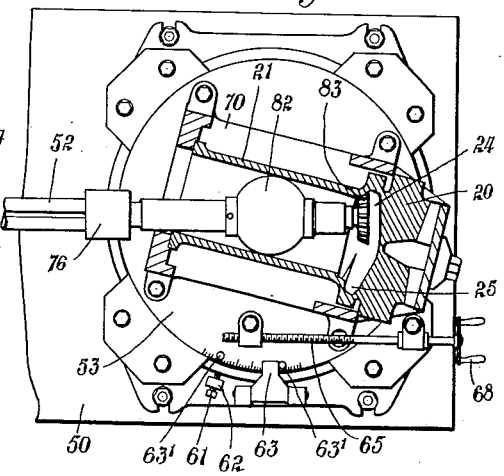

If desired, the lower edges of these pockets 25 may be beveled off by the use of a tool 83, as shown in Fig. 10, the ball guide 82 being the same as used in connection with the tool 81.

Figure 11:
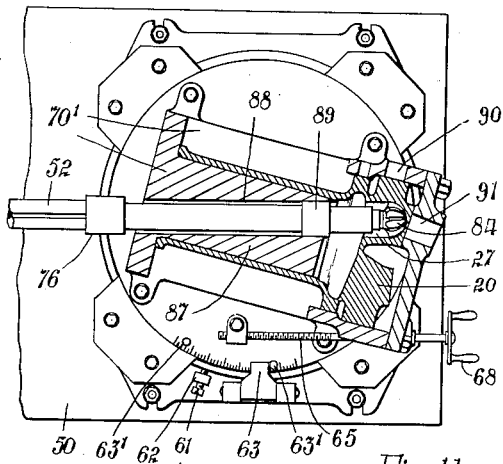

In Fig. 11 the jig 70 has been replaced by jig 70' of modified form having the central stud projection 87 on which the cylinder fits, said projection having a guide opening 88 therethrough and set at the proper angle for the machining of the gas passages 27.

The table 53 in Fig. 11 has been oscillated so that one of the pins 63' contacts with the stop plate 63 and positions the table with the guide opening 88 in the jig 70' in alinement with a tool 84 which is known as a rose head tool.

The rose head tool 84 is guided through the opening 88 in the jig by a sleeve 89 and as the tool advances by the longitudinal movement of the spindle 52 it forms the inner end of one of the gas passages 27 of the cylinder 20.

It will be understood that as soon as the tool 84 has formed one of these gas passages, it is withdrawn and the cylinder is turned about the stud projection and clamped in position for forming the other gas passages.

Figure 12:
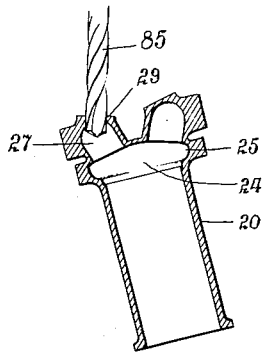
Figs. 12, 13 and 14 illustrate several machining operations performed on the cylinder.
Figure 13:
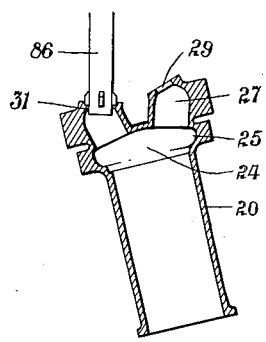
Figure 14:
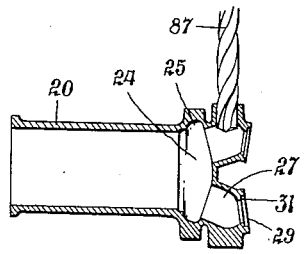

After the inner ends of the gas passages have been formed, the cylinders are completed by the operations shown in Figs. 12, 13 and 14. Thus in Fig. 12 a suitable drill 85 is used to form the opening 29 in the passage 27, and a suitable tool 86, shown in Fig. 13, cuts the metal away to form the shoulder 31 of the cylinder. In Fig. 14 a drill 87 is shown operating from the outside of the cylinder to complete the gas passage 27, this drill being fed inwardly until it intersects the inner part of the passage formed by the tool 84. This completes the machining operations of the cylinder, and it will be seen that the entire interior of the cylinder including the combustion space and the gas passages is formed with machined walls.

One of the advantages obtained by using the rose head tool 84 is the hemispherical shaped end of the gas passage prior to the drilling by the tools 85 and 87 whereby said tools will enter the gas passage uniformly on all sides and thus make passages of regular contour. Also the operations of the tools 85, 86, and 87 may be performed while the cylinder 20 is still securely held in position on the jig, suitable openings 91 and 90 being made in said jig for such purposes all as shown in Fig. 11.

Having thus described my invention, what I claim and desire to secure by Letters Patent is:—

1. The method of machining the combustion space of a motor cylinder consisting in relatively oscillating a rotary tool in the cylinder head while guiding the tool in the cylinder.

2. The method of machining the combustion space of a motor cylinder consisting in rotating a cutting tool in the cylinder head and oscillating the cylinder relatively to the tool to cause the latter to cut pockets in said cylinder head.

3. The method of machining the combustion space of a motor cylinder consisting in rotating a cutting tool in the cylinder head and moving the cylinder laterally relatively to the tool to cause the latter to cut pockets in said cylinder head.

4. The method of machining the combustion space of a motor cylinder consisting in rotating a cutting tool in the cylinder head and causing a relative lateral movement between the cylinder and tool to cause the latter to operate on the side walls of the cylinder head.

5. The method of machining motor cylinders consisting in machining the interior of the cylinder barrel, then guiding a rotary tool in said barrel to machine the interior of the cylinder head.

6. The method of machining motor cylinders consisting in machining the interior of the cylinder barrel, then rotating a tool coaxially with said barrel to machine the interior of the cylinder head.

7. The method of machining motor cylinders consisting in machining the interior of the cylinder barrel, then rotating a tool coaxially with said barrel to machine the interior of the cylinder head and then rotating a tool in the cylinder head while causing a relative lateral movement between the cylinder and tool to cause the latter to operate on the side walls of the cylinder head.

8. The method of machining motor cylinders consisting in machining the interior of the cylinder barrel, then using said barrel as a guide for the tool in machining the interior of the cylinder head.

9. The method of machining motor cylinders consisting in machining the interior of the cylinder barrel, then using said barrel as a guide for the tools in machining the combustion space and intake and exhaust passages.

10. The method of machining motor cylinders consisting in machining the interior of the cylinder barrel, then using the barrel as a guide in machining the combustion space.

11. The method of machining motor cylinders, consisting in machining the interior of the cylinder barrel, then using the barrel as a guide in machining the interior of the cylinder head to dome shape and then machining pockets in the opposite sides of said dome shaped head.

12. The method of machining motor cylinders, consisting in machining the interior of the cylinder barrel, then machining the interior of the cylinder head to dome shape, then machining pockets in opposite sides of said dome shaped head, and then boring out the intake and exhaust passages above said pockets, the machined cylinder barrel being used as a guide in the subsequent machining operations.

13. The method of machining motor cylinders consisting in machining the interior of the cylinder barrel, then machining the interior of the cylinder head to dome shape, and then machining intake and exhaust passages from the inside of the cylinder upwardly and outwardly.

14. The method of machining motor cylinders, consisting in machining the interior of the cylinder barrel, then machining the interior of the cylinder head to dome shape, then boring diagonally upwardly from the inside of the cylinder to form the inner ends of intake and exhaust passages, and then drilling from the outside crosswise of the cylinder to intersect said passages and thus complete them.

In testimony whereof I affix my signature.

JESSE G. VINCENT.